US009742247B2

(12) United States Patent
Schoele et al.

(10) Patent No.: US 9,742,247 B2
(45) Date of Patent: Aug. 22, 2017

(54) THERMALLY PROTECTED ELECTRIC MOTOR

(71) Applicant: BROSE FAHRZEUGTEILE GMBH & CO. KOMMANDITGESELLSCHAFT, WUERZBURG, Wuerzburg (DE)

(72) Inventors: Rainer Schoele, Leinach (DE); Frank Hartmann, Kitzingen (DE); Peter Stockmann, Gerbrunn (DE); Frank Capristo, III, Veitshoechheim (DE)

(73) Assignee: Brose Fahzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 450 days.

(21) Appl. No.: 14/554,351

(22) Filed: Nov. 26, 2014

(65) Prior Publication Data

US 2015/0076946 A1   Mar. 19, 2015

Related U.S. Application Data

(63) Continuation of application No. PCT/EP2012/003017, filed on Jul. 18, 2012.

(51) Int. Cl.
*H02K 11/00* (2016.01)
*H02K 13/00* (2006.01)
(Continued)

(52) U.S. Cl.
CPC .......... *H02K 13/006* (2013.01); *H02K 5/148* (2013.01); *H02K 11/25* (2016.01); *H02K 23/66* (2013.01);
(Continued)

(58) Field of Classification Search
CPC ................. H01H 37/76; H01H 37/761; H01H 2037/762; H01H 2037/763;
(Continued)

(56) References Cited

U.S. PATENT DOCUMENTS 1,932,194 A  * 10/1933 Steinmayer ............ H01H 85/36
                                                337/237
2,149,773 A  *  3/1939 Huntley ............... H01H 37/761
                                                337/403
(Continued)

FOREIGN PATENT DOCUMENTS

CN    101322294 A    12/2008
CN    103166357    *  6/2013
(Continued)

OTHER PUBLICATIONS

Schulz, partial machine translation of DE1515019, Jun. 1969.*
Speretta et al., machine translation of CN103166357, Jun. 2013.*

*Primary Examiner* — Quyen Leung
*Assistant Examiner* — Eric Johnson
(74) *Attorney, Agent, or Firm* — Laurence A. Greenberg; Werner H. Stemer; Ralph E. Locher (57) ABSTRACT

An electric motor for driving a motor vehicle component, such as a fan motor for cooling cooling water, has a thermal fuse with a contact spring. The contact spring has attached ends that are connected to a conducting path section between which an interruption point is formed. The springy ends of the contact spring are in soldered contact with each other in a spring-biased manner. The thermal fuse is a fuse module with a plastic support in which the conducting path sections are partially embedded in such a way that the contact spring lies in a window opening in the support. Terminals of the conducting path sections protrude from the plastic support.

20 Claims, 6 Drawing Sheets

(51) Int. Cl.
*H02K 5/14* (2006.01)
*H02K 23/66* (2006.01)
*H02K 11/25* (2016.01)
*H02K 11/026* (2016.01)

(52) U.S. Cl.
CPC ........ *H02K 11/026* (2013.01); *H02K 2209/00* (2013.01)

(58) Field of Classification Search
CPC ........ H02K 11/26–11/27; H02K 11/25; H02K 13/006; H02K 23/66; H02K 2209/00; H02H 5/04; H02H 5/041; H02H 5/046; H02H 5/047; H02H 5/048
USPC ....... 310/68 C; 337/186, 239, 401, 404, 405, 337/407
See application file for complete search history.

(56) References Cited

U.S. PATENT DOCUMENTS

| | | | |
|---|---|---|---|
| 2,789,182 A * | 4/1957 | Baenziger | H01H 85/36 337/165 |
| 4,386,335 A * | 5/1983 | O'Brien et al. | H01H 85/0454 337/260 |
| 5,084,691 A * | 1/1992 | Lester | H01H 61/00 337/166 |
| 6,184,601 B1 | 2/2001 | Baer et al. | |
| 6,188,154 B1 | 2/2001 | Luedtke et al. | |
| 7,511,397 B2 | 3/2009 | Eisert et al. | |
| 7,742,269 B2 * | 6/2010 | Shinohara | H01H 37/002 219/517 |
| 7,864,024 B2 * | 1/2011 | Schlenker | H01H 37/761 337/239 |
| 8,581,686 B2 * | 11/2013 | Galla | H01H 37/761 29/623 |
| 8,633,621 B2 | 1/2014 | Muhl et al. | |
| 8,665,057 B2 * | 3/2014 | Schlenker | H01H 37/761 337/239 |
| 8,767,368 B2 * | 7/2014 | Yoneda | H01H 83/20 361/104 |
| 9,007,163 B2 * | 4/2015 | Duval | H01C 7/126 337/1 |
| 9,083,174 B2 * | 7/2015 | Meyer | H01H 37/767 |
| 9,496,112 B2 * | 11/2016 | Qin | H01H 85/306 |
| 2008/0204188 A1 | 8/2008 | Gass et al. | |
| 2010/0142109 A1 | 6/2010 | Yu | |

FOREIGN PATENT DOCUMENTS

| | | | |
|---|---|---|---|
| DE | 1515019 A1 | 6/1969 | |
| DE | 29512310 U1 | 12/1996 | |
| DE | 102005032393 A1 | 1/2007 | |
| DE | 102005032394 A1 | 1/2007 | |
| DE | 102007054872 A1 | 5/2008 | |
| DE | 202010002664 U1 | 7/2011 | |
| FR | 2780578 A1 | 12/1999 | |
| SE | WO 8801790 A1 * | 3/1988 | .......... H01H 85/044 |
| WO | 0051223 A1 | 8/2000 | |
| WO | 2005078907 A1 | 8/2005 | |
| WO | 2007006270 A1 | 1/2007 | |
| WO | 2011103947 A2 | 9/2011 | |

* cited by examiner

FIG. 6

THERMALLY PROTECTED ELECTRIC MOTOR

CROSS-REFERENCE TO RELATED APPLICATION

This is a continuation application, under 35 U.S.C. §120, of copending international application No. PCT/EP2012/003017, filed Jul. 18, 2012, which designated the United States; the prior application are herewith incorporated by reference in their entirety.

BACKGROUND OF THE INVENTION

Field of the Invention

The invention relates to an electric motor for driving a motor vehicle component. The motor has a rotor with a commutator in a motor housing. At least one brush rests against the commutator in a contacting manner. The motor also has a thermal fuse with a contact spring formed from two contact arms each with a fixing end and a spring end. The fixing ends are each contacted with a current path portion, between which an interruption point is formed. The spring ends are contacted with one another via a soldered connection under spring bias, The term "electric motor," as used herein, is to be understood to mean a motor for driving a motor vehicle component, in particular a DC fan motor for chilling cooling water of a motor vehicle.

Adjustment systems of motor vehicles driven by an electric motor, such as window lifters, seat adjusters, door and sunroof drives or radiator fan drives, have a controlled electric motor, which is generally a commutator motor with a rotor provided with a winding and with a stator formed from permanent magnets and also with a brush system, of which the brushes glide over the commutator bars in order to transfer the motor current into the rotor winding. In addition to suppression elements, a spring-loaded thermal fuse in the form of a soldered joint or connection is often provided within the brush system as overload protection. With an overload current flowing over a certain time, the solder is melted, such that a conducting path is interrupted spontaneously as a result of the spring bias of the thermal fuse.

A thermal fuse in the form of a contact spring with two contact arms is described in commonly assigned U.S. Pat. No. 8,633,621 B2 and its counterpart int'l patent application publication WO 2011/103947 A1; there, the fixing ends are electrically conductively connected to a respective current path end of a current path conveying the motor current. The current path is in turn part of a plastic-sheathed pressed screen. An interruption point is introduced between the two current path ends of the current path engraved in this way in an electric insulation and is bridged by the contact spring. The spring ends of the contact arms of the contact springs opposite the fixing ends are soldered to one another under spring bias. The soldered connection melts in the case of overload and thus trips the thermal fuse.

SUMMARY OF THE INVENTION

It is accordingly an object of the invention to provide a thermally protected electric motor which overcomes the above-mentioned and other disadvantages of the heretofore-known devices and methods of this general type and which provides for an electric motor, in particular a DC current fan motor for a motor vehicle, with a thermal fuse (thermal protection) that is improved in particular in terms of the mounting and/or material outlay.

With the foregoing and other objects in view there is provided, in accordance with the invention, an electric motor for driving a motor vehicle component, such as a coolant fan, the electric motor comprising:

a motor housing;

a rotor with a commutator and at least one brush resting against and contacting the commutator;

a fuse module forming a thermal fuse of the electric motor, the thermal fuse having a contact spring formed of two contact arms each with a fixing end and a spring end, wherein each the fixing end is contacted with a current path portion, between which an interruption point is formed, and the spring ends are contacted with one another via a soldered connection under spring bias;

the fuse module having a plastic support, in which the current path portions are partially embedded and the contact spring lies in a window opening formed in the plastic support and wherein terminal ends of the current path portions protrude from the plastic support.

In other words, the electric motor, which in particular is operated without electronics and in just one direction of rotation, has, in a motor housing, a rotor with a commutator, against which at least one brush rests with contact. A thermal fuse with a contact spring formed from two contact arms each with a fixing end and a spring end is designed as a fuse module and has a plastic support, in which current path portions are partially embedded in such a way that on the one hand the contact spring lies in a window-like opening in the support and on the other hand terminal ends of the current path portion protrude from the plastic support. The fixing ends of the contact arms of the contact spring are each contacted with a respective current path portion, between which an interruption point is formed. The spring ends of the contact arms of the contact spring are contacted with one another via a soldered connection under spring bias.

Preferably, only one of the two contact arms of the contact spring is bent so as to provide, in the soldered state of the two contact arms, the spring bias or restoring force of the contact spring for tripping the fuse module. The other contact arm is suitably shaped in a recess-like manner in the region of the contact point so as to receive the solder for producing the soldered connection to the spring end of the contact arm bent so as to produce the spring bias.

The contact springs are suitably mounted on the current path portions of the fuse module via a combined snap-fit or detent connection on the one hand and a welded or soldered connection on the other hand. To this end, the contact arms of the contact springs each form a substantially U-shaped base portion with two fixing tabs distanced from one another via a middle fixing plate. The resilient and bent fixing tabs distanced from one another are intended and designed, during the course of the assembly of the fuse module, to latch into corresponding detent or snap-fit openings in the respective current path portion with a form fit and/or force fit. In this way, a reliable fixing and in particular a positioning of the contact arms in the fuse module are already enabled. For the additional welded or soldered connection, a number of openings are formed in the fixing plate of the respective contact arm so as to ensure a reliable degassing during the welding or soldering process.

In an advantageous embodiment, the terminal ends of the current path portions, the terminal ends protruding from the plastic support of the fuse module, are designed to produce a welded or soldered connection to components that convey the motor current. Here, a first of the terminal ends is intended and designed, in the installed state of the fuse module, to be directly contacted with a first conductor core of a current-conveying supply line. In other words, this first terminal end constitutes the contact point for the first conductor core of the supply line conveying the motor current. In this embodiment, the first terminal end, in the installed state of the fuse module, is suitably directly contacted with a first suppression element, in particular with a terminal pin of a capacitor.

In accordance with a further expedient embodiment, one of the current path portions of the fuse module has a terminal lug protruding from the plastic support. The terminal lug is configured to produce a direct ground connection to the housing ground, in particular to a housing lid of the motor housing.

The (second) terminal end of the other current path portion is suitably intended and designed, in the installed state of the fuse module, to be directly contacted with a second suppression element, in particular with a winding end of a choke coil.

In a particularly advantageous development of the fuse module, a number of detent elements, preferably two or three detent elements, are integrally formed on the plastic support of said fuse module. The detent elements are suitably embodied in the form of detent hooks. These are intended and designed to cooperate with corresponding detent elements, preferably with detent recesses, of a brush support consisting of insulating material and to fix the fuse module, that is to say the modular thermal fuse, within the motor housing. In order to ensure a free rebound of the biased spring end of the contact spring in the event of tripping of the thermal fuse, the window-like opening in the plastic support of the thermal fuse is formed appropriately in terms of the length and width dimensions.

In accordance with a further embodiment of the invention, the fuse module is arranged in the vicinity of the brush and preferably above or below the brush. Here, the fuse module is arranged suitably in the brush support in such a way that the brush is arranged below or above the interruption point and therefore below or above the soldered connection of the spring ends of the contact spring of the fuse module. An inadmissibly or undesirably strong, that is to say intense, development of heat of the brush thus easily and reliably causes the soldered connection of the fuse module installed in the brush support to melt, thus tripping the thermal fuse.

The advantages attained with the invention lie in particular in the fact that, due to the provision of a modular thermal fuse also referred to hereinafter as a fuse module, this can be prefabricated as a separate component, such that a versatile use of the thermal fuse or of the fuse module as a unit on a brush system of an electric motor of this type is provided. In addition, the installation of the fuse module is significantly simplified, and in addition a particularly simple and failsafe contact with the components provided as intended is made possible at the terminal ends of said fuse module, which are positioned in a defined manner in the installed position. In addition, there is no need to provide a pressed screen, which is costly in terms of material, to convey the motor current.

Furthermore, the openings in the fixing tabs of the contact arms of the contact spring enable a degassing during the soldering process. Furthermore, a particularly simple, direct ground connection of the fuse module to the housing ground by means of the corresponding terminal lugs protruding from the plastic support is made possible. Coil or winding short circuits of the motor or rotor winding can thus be identified particularly easily and reliably.

A fuse module of this type is therefore particularly suitable for use in a DC electric motor without control electronics and also with just one drive direction (direction of rotation) and thus in particular for a cooling fan motor of a motor vehicle. Precisely such a fan motor can result in an increased fire risk, especially since it may then also still be in operation for a necessary chilling of cooling water when the vehicle has already been stopped and left by the user.

Other features which are considered as characteristic for the invention are set forth in the appended claims.

Although the invention is illustrated and described herein as being embodied in a thermally protected electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
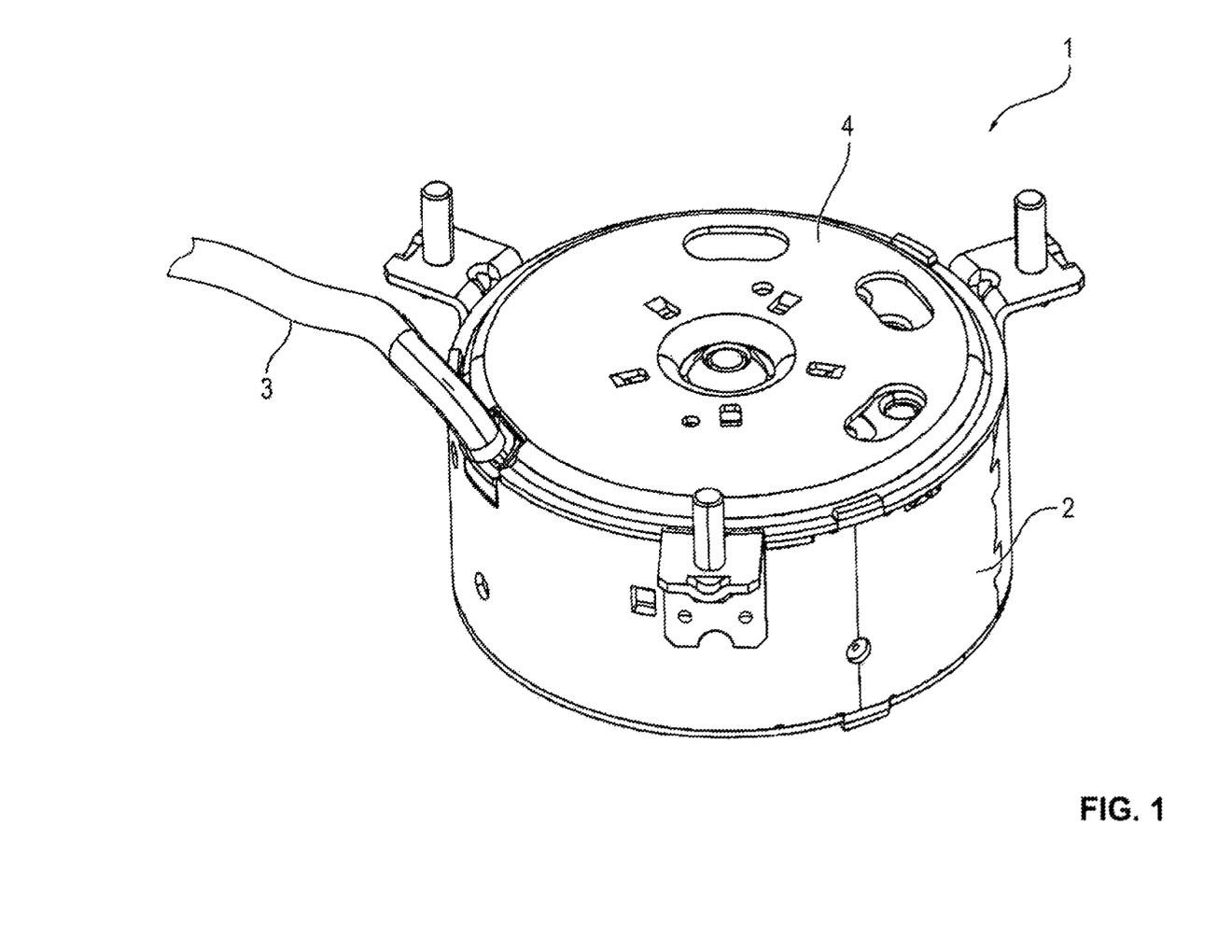
FIG. 1 shows a perspective view of an electric motor with a motor housing and with a current terminal.

Referring now to the figures of the drawing in detail and first, particularly, to FIG. 1 thereof, there is shown an electromotive drive 1 which will be referred to hereinafter as an electric motor. The electric motor 1 has a motor housing 2 consisting of metal and having a housing lid 4. An electric supply cable 3 has conductors (FIGS. 2 and 3) that are guided into the motor housing 2.

Figure 2:
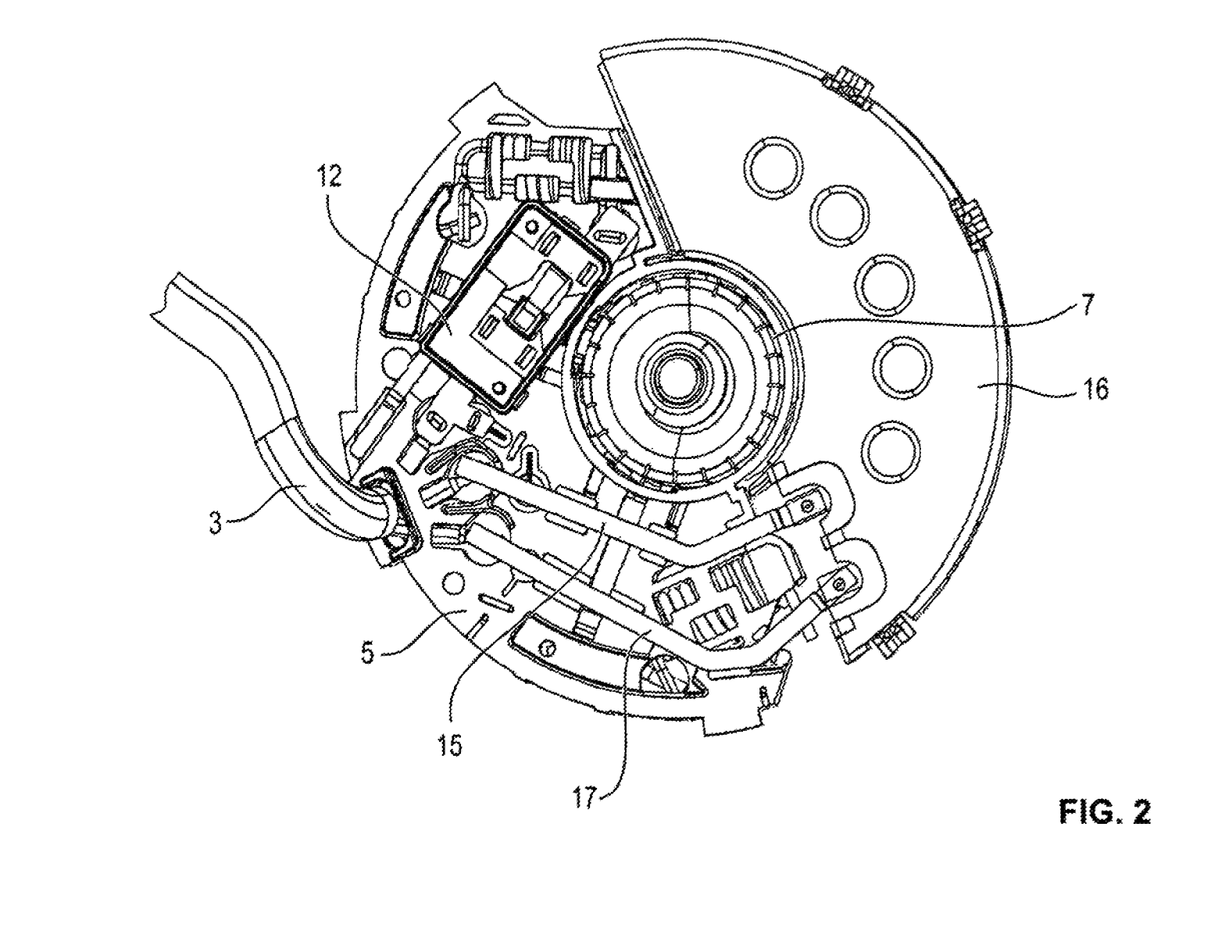
FIG. 2 shows a plan view of a brush support of a brush system of the electric motor according to FIG. 1 without motor housing, said brush support supporting a fuse module according to the invention.
Figure 3:
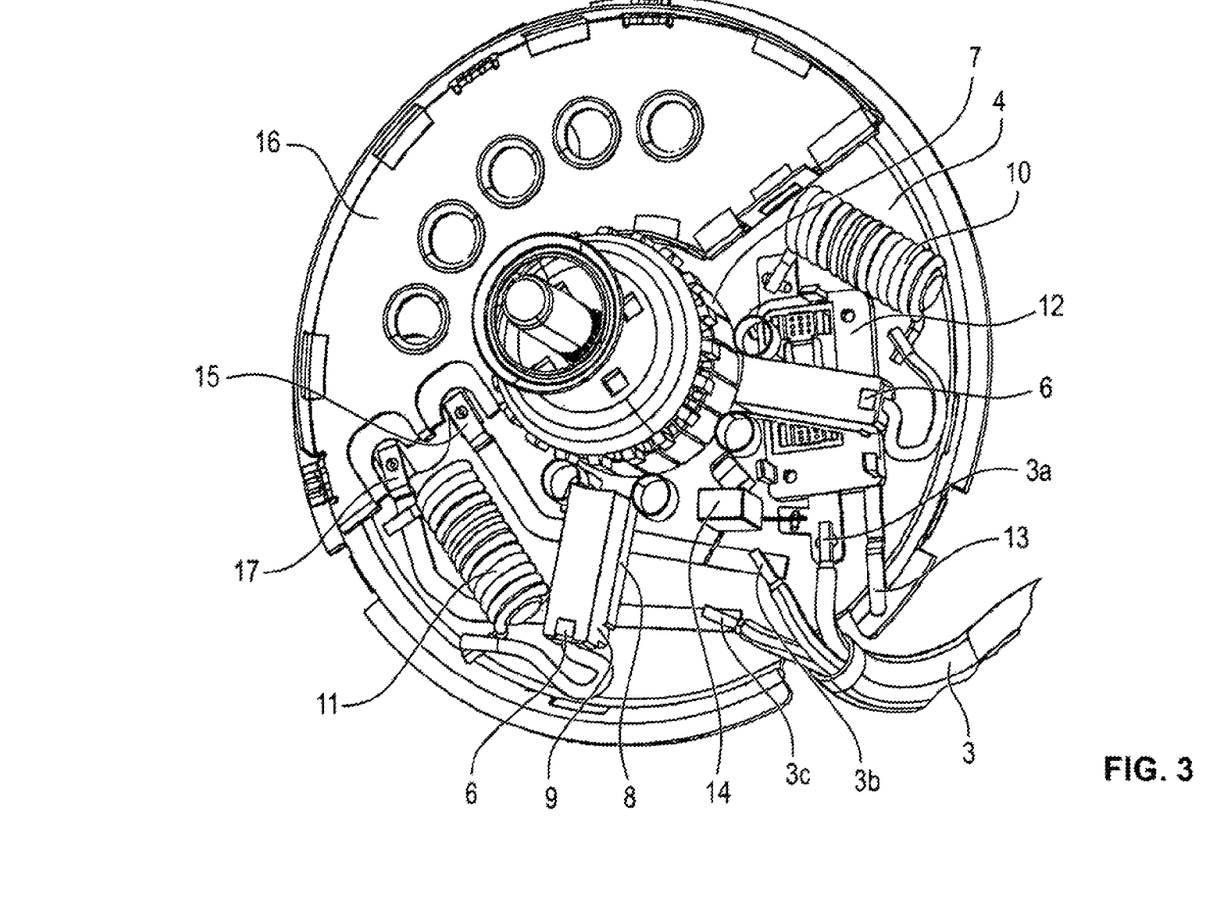
FIG. 3 shows a view from beneath of the brush system according to FIG. 2 without brush support and with ground connection of the fuse module to a housing lid of the motor housing.

A brush system of the electric motor 1 without motor housing is illustrated in FIGS. 2 and 3 respectively in plan view on a brush support 5 (FIG. 2) and with a view of the opposed underside without brush support 5, but with the housing lid 4 (FIG. 3). The brush support 5 consists of an electrically non-conductive material, in particular made of plastic. On the underside (FIG. 3) of the brush support 5 produced as an injection molded part, at the periphery of a rotor (not illustrated in greater detail) of the electric motor 1, two carbon brushes 6 as sliding contacts are guided under spring bias toward a commutator 7 fixed to the rotor and having a plurality of commutator bars. To this end, the carbon brushes 6 biased by means of a spring element 8 are located in a brush cartridge 9.

The carbon brushes 6 are each electrically conductively connected to a suppression choke (choke coil) 10, 11, wherein the suppression choke denoted by 10 is connected via a thermal fuse 12, referred to hereinafter as a fuse module, to one of the lines 3a of the supply cable 3. The fuse module 12, on the side of the conductor terminal, has a ground connection 13, which is directly contacted with the housing lid 4. The fuse module 12 is additionally connected on the side of the conductor terminal to a terminal pin of a capacitor 14, of which the other terminal pin is connected to a current path or current bar 15. This leads via a flat resistor, which is arranged in a resistor housing 16 and which is not visible, to a second current bar 17, with which the suppression choke 11 is contacted. The current bars 15, 17 are connected to further lines 3b and 3c of the supply cable 3. The flat resistor is used for a stepped rotational speed regulation of the electric motor 1.

As can be seen clearly by way of comparison from FIG. 3, the fuse module 12 is arranged in the vicinity of and virtually between the brush support 5 and the brush 6, that is to say above or below the brush 6 depending on the point of observation. Here, the fuse module 12 is arranged in such a way that the brush 6 is arranged below or above the interruption point 12 and therefore below or above the soldered connection of the contact spring 24. It is thus ensured that an unreliably high development of heat of the brush 6 causes the soldered connection of the fuse module 12 incorporated in the brush support 5 to melt and thus trips the thermal fuse.

Figure 4:
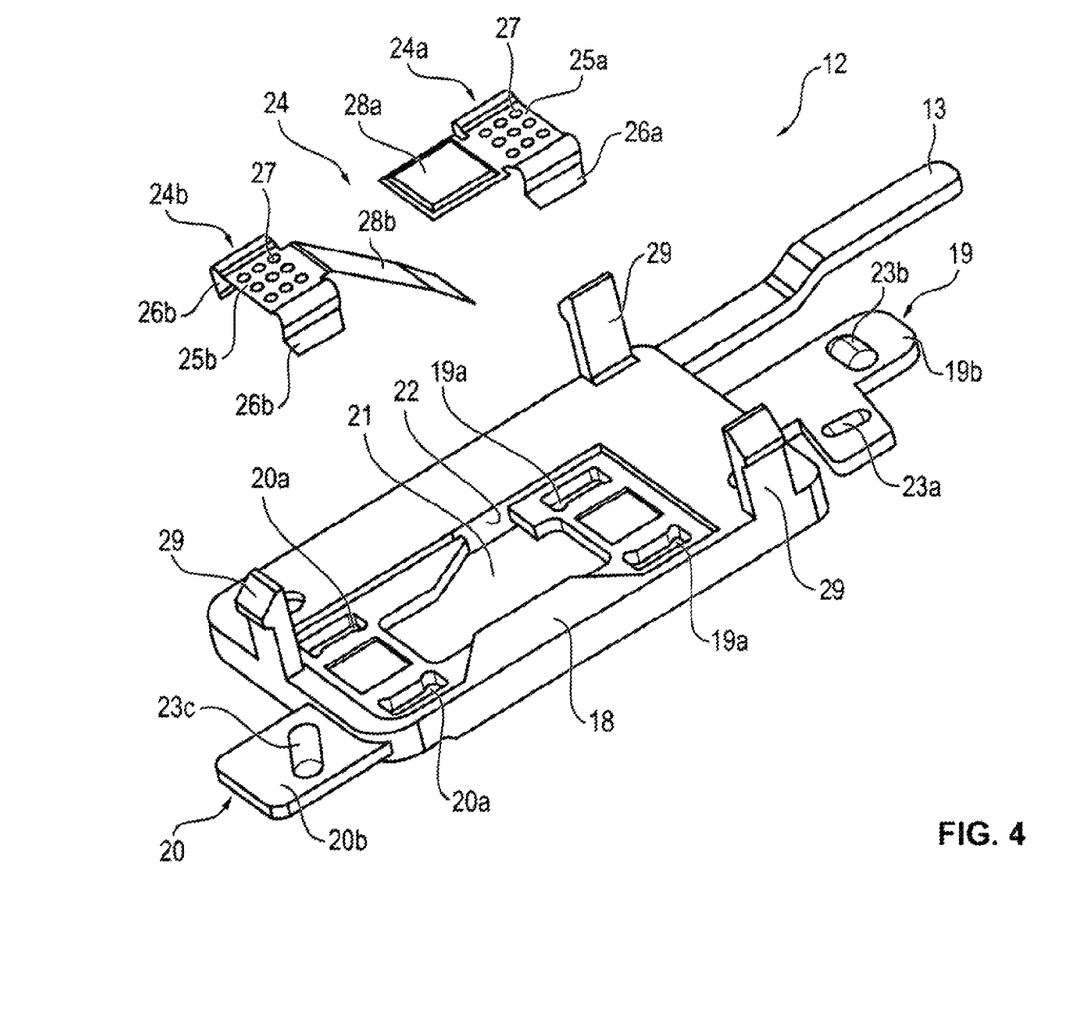
FIG. 4 shows the fuse module in a partly exploded illustration.
Figure 5:
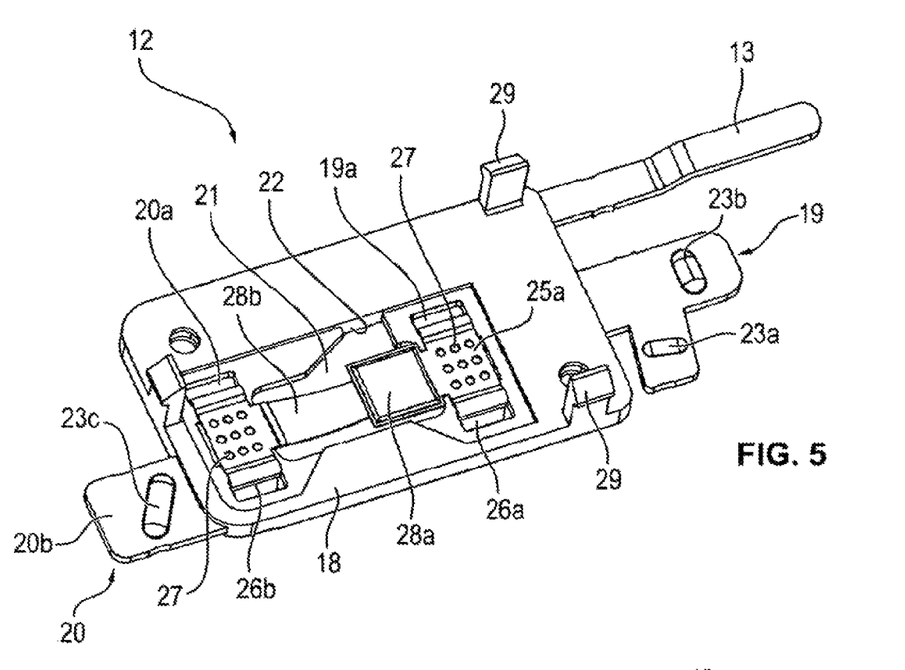
FIG. 5 shows the fuse module in plan view.
Figure 6:
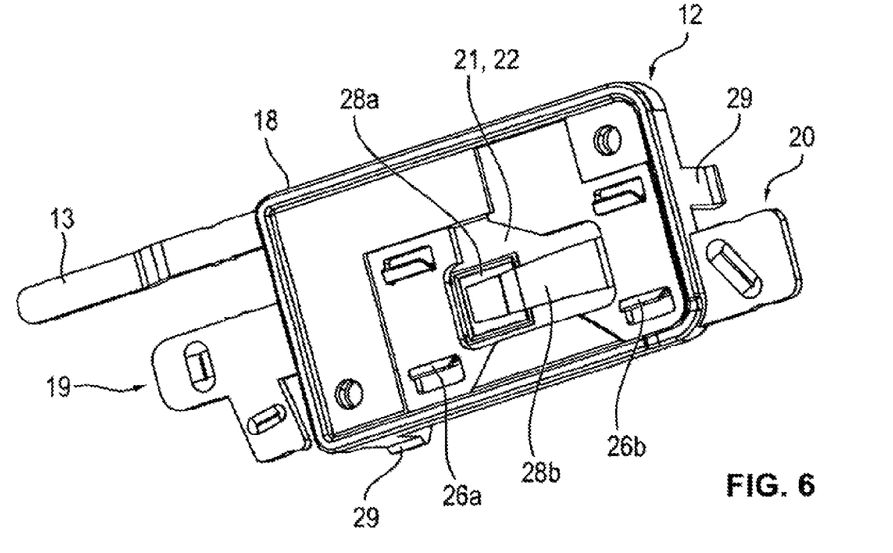
FIG. 6 shows the fuse module from beneath.

FIGS. 4 to 6 show the modular thermal fuse, that is to say the fuse module 12, in different illustrations. The fuse module 12 comprises a plastic support 18, in which two current path portions 19, 20 are embedded with release or with formation of an interruption point 21. In the region of the interruption point 21, a window-like opening 22 in the support is left free in the plastic support 18. This extends over part of the current path portions 19, 20 so as to form detent recesses 19a in the current path portion 19 and detent recesses 20a in the current path portion 20.

The current path portion 20 protrudes via a terminal end 20b from the plastic support 18. Similarly, the current path portion 19 protrudes via a first terminal end 19b from the plastic support 18. In parallel hereto, a terminal lug 13 protrudes from the plastic support 18 as ground connection and is likewise part of the current path portion 19. In the state in which the fuse module 12 is mounted in the motor housing 2, more specifically on the brush support 5, this terminal lug 13 is electrically conductively contacted with the housing lid 4 of the motor housing 2. The terminal end 19b of the current path portion 19 provides two terminal or contact points 23a and 23b for contacting the capacitor 14 on the one hand and the line 3a on the other hand. The terminal end 20b of the other current path portion 20 provides a contact face 23c for the suppression choke 10 according to FIG. 3.

The fuse module 12 further comprises a contact spring 24 having a first contact arm 24a and having a second contact arm 24b. Both contact arms 24a and 24b have a substantially U-shaped base portion each with two fixing tabs 26a and 26b distanced from one another via a middle fixing plate 25a, 25b. The fixing tab pairs 26a and 26b correspond to the detent recesses 19a and 20a of the current path portions 19 and 20 within the window-like opening 22 in the plastic support 18.

FIGS. 5 and 6 show a plan view and a view from below respectively of the latched state of the contact arms 24a, 24b with the respective current path portions 19 and 20. In the installed state of the fuse module 12, the contact arms 24a, 24b are additionally soldered to the respective current path portions 19 and 20. For degassing during the soldering process, a number of openings 27 are formed in the respective base portion, more specifically in the middle fixing plates 25a and 25b, and are clearly visible by way of comparison in FIG. 5.

In contrast to the base portions of the contact arms 24a and 24b, which practically represent the fixing ends of the contact arms 24a, 24b, the spring free ends 28a, 28b of the contact arms 24a and 24b are formed differently. The contact arm 24b thus has a bent spring tongue as a spring end 28b, whereas the spring end 28b of the contact arm 24b is formed in a recess-like manner.

As can be seen from FIGS. 5 and 6, the spring end 28b of the contact spring 24 formed as a spring tongue is subject to spring bias in the recess-like spring end 28a of the other contact arm 24a of the contact spring 24 and is soldered there with a defined amount of solder. In the event that the fuse module is tripped, the spring end 28b of the contact spring 24 under spring bias can rebound freely when the soldered connection is opened, due to the spring-like support opening 22.

The contact spring 24 preferably consisting of copper beryllium is suitably coated with a galvanic barrier layer, preferably with nickel. The contact spring 24 coated in this way and consisting of copper beryllium is suitably additionally tin-plated.

Figure 7:
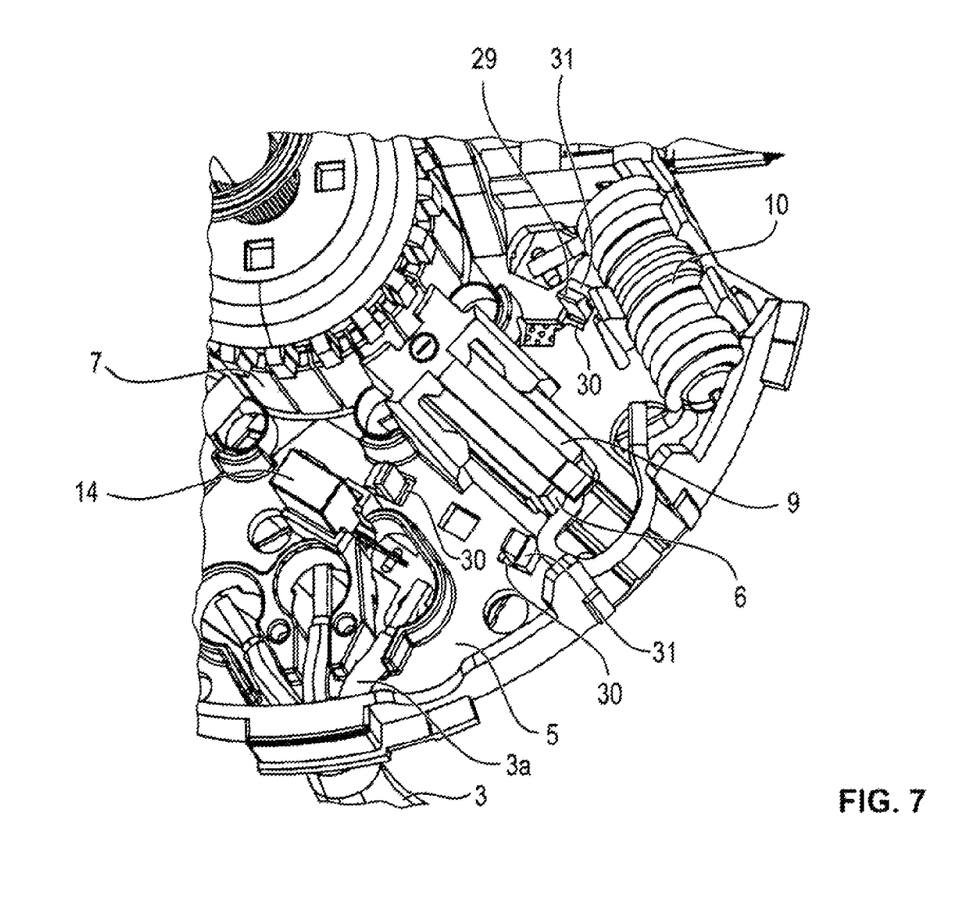
FIG. 7 shows the brush support in portions with a view of three detent connections of the mounted fuse module.

A number of detent hooks 29, in the exemplary embodiment three detent hooks, are integrally formed on the plastic support 18 of the fuse module 12 and protrude substantially perpendicularly from the plane of the plastic support 18 and of the current path portions 19, 20. The fuse module 12 is fastened in a simple and reliable manner in the brush support 5 by means of these detent hooks 29, as can be seen from FIG. 7. The brush support 5 to this end has corresponding detent recesses 30, which are provided with detent domes 31, behind which or over which the detent hooks 29 engage in the illustrated latched state.

The invention is not limited to the above-described exemplary embodiment. Rather, other variants of the invention can also be derived herefrom by a person skilled in the art without departing from the subject matter of the invention. In particular, all individual features described in conjunction with the exemplary embodiment can also be combined with one another differently without departing from the subject matter of the invention.

The following is a summary list of reference numerals and the corresponding structure used in the above description of the invention:

1 drive/electric motor
2 motor housing
3 supply cable
3a-c line
4 housing lid
5 brush support
6 brush
7 commutator
8 spring element
9 brush cartridge
10, 11 suppression choke
12 thermal fuse/fuse module
13 terminal lug
14 capacitor
15 current bar
16 resistor housing
17 current bar 18 plastic support
19 current path portion
19a detent opening
19b terminal end
20 current path portion
20a detent opening
20b terminal end
21 interruption point
22 support opening
23a-c terminal/contact point
24 contact spring
24a, b contact arm
25a, b fixing plate
26a, b fixing tab
27 opening
28a spring end/tongue
28b spring end
29 detent hook
30 detent recess
31 detent dome

The invention claimed is:

1. An electric motor for driving a motor vehicle component, the electric motor comprising: a motor housing; a rotor with a commutator and at least one brush resting against and contacting said commutator; a fuse module forming a thermal fuse of the electric motor, said thermal fuse having a contact spring formed of two contact arms each with a fixing end and a spring end, wherein each said fixing end is contacted with separate current path portions, between which an interruption point is formed, and said spring ends are contacted with one another via a soldered connection under spring bias to bridge the current path portions at the interruption point; said fuse module having a plastic support, in which said current path portions are partially embedded and said contact spring lies in a window opening formed in said plastic support and wherein terminal ends of said current path portions protrude from said plastic support.

2. The electric motor according to claim 1, wherein said terminal ends of said current path portions are configured for a soldered or welded connection to components for conducting an electric motor current.

3. The electric motor according to claim 1, wherein said terminal ends include a first terminal end configured, in an installed state of said fuse module, to be directly contacted with a first conductor core of a supply cable conducting a motor current.

4. The electric motor according to claim 3, which comprises a first suppression element directly contacting said first terminal end in the installed state of said fuse module.

5. The electric motor according to claim 4, wherein said first suppression element is a terminal pin of a capacitor.

6. The electric motor according to claim 1, wherein one of said current path portions has a terminal lug protruding from said plastic support, said terminal lug being configured for a direct ground connection to a housing ground.

7. The electric motor according to claim 6, wherein said motor housing has a housing lid and said terminal lug makes direct ground connection to said housing lid of said motor housing.

8. The electric motor according to claim 3, wherein said terminal ends include a second terminal end configured, in an installed state of the fuse module, to be directly contacted with a second suppression element.

9. The electric motor according to claim 8, wherein said second terminal end is contacted with a winding end of a choke coil.

10. The electric motor according to claim 1, wherein said terminal ends include a second terminal end configured, in an installed state of the fuse module, to be directly contacted with a suppression element.

11. The electric motor according to claim 10, wherein said second terminal end is contacted with a winding end of a choke coil.

12. The electric motor according to claim 1, wherein said plastic support is integrally formed with a plurality of detent elements configured to cooperate with corresponding detent elements of a brush support of insulating material and to fix said fuse module within said motor housing.

13. The electric motor according to claim 12, wherein said plurality of detent elements are two or three detent hooks configured to cooperate with corresponding detent recesses formed in said brush support.

14. The electric motor according to claim 1, wherein said fuse module is disposed in a vicinity of said brush.

15. The electric motor according to claim 14, wherein said fuse module is disposed above or below said brush in a direction along an axis of rotation of the rotor.

16. The electric motor according to claim 15, wherein said fuse module is arranged in said brush support to locate said brush below or above said interruption point and said soldered connection of said spring ends of said contact spring of said fuse module in the direction along the axis of rotation of the rotor.

17. The electric motor according to claim 1, wherein said window opening is formed in said plastic support to allow said spring end of said contact spring under spring bias to rebound freely when said soldered connection is opened.

18. The electric motor according to claim 1, wherein each of said contact arms of said contact spring has a substantially U-shaped base portion with two fixing tabs distanced from one another via a middle fixing plate, and wherein said fixing plate is formed with a plurality of openings for a passage of soldering or welding material to an associated current path portion.

19. The electric motor according to claim 11, wherein said fixing tabs are configured to correspond with openings in the respective current path portion for producing a snap-fit or a detent connection.

20. The electric motor according to claim 1, configured as a fan motor for chilling cooling water.

* * * * *